United States Patent [19]
Andrieu

[11] Patent Number: 5,321,728
[45] Date of Patent: Jun. 14, 1994

[54] CLOCK SIGNAL MULTIPLEX CIRCUIT

[75] Inventor: Vianney Andrieu, Paris, France

[73] Assignee: Alcatel N.V., Amsterdam, Netherlands

[21] Appl. No.: 57,408

[22] Filed: May 3, 1993

Related U.S. Application Data

[63] Continuation of Ser. No. 686,679, Apr. 17, 1991, abandoned.

Foreign Application Priority Data

Apr. 18, 1990 [FR] France .................................. 90 04926

[51] Int. Cl.$^5$ ......................... H04J 3/22; H04Q 11/04
[52] U.S. Cl. .................................... 375/106; 375/110; 370/108; 307/480
[58] Field of Search ............................. 375/106–108, 375/110, 20; 370/108; 307/269, 480; 328/63, 72, 104; 371/61–62

[56] References Cited

U.S. PATENT DOCUMENTS 4,692,932  9/1987  Denhez et al. ...................... 375/108
4,839,907  6/1989  Saneski ................................. 371/61

Primary Examiner—Stephen Chin
Assistant Examiner—Young Tse
Attorney, Agent, or Firm—Robbins, Berliner & Carson

[57] ABSTRACT

A multiplexer circuit for multiplexing several clock signals is controlled by at least one selection signal, and includes for each clock signal a respective delay module producing a delayed clock signal taking the value of the clock signal in response to the appearance of a predetermined switching level of the clock signal while the selection signal is in a first state and no busy signal is then present, and interrupting the delayed clock signal in response to the appearance of the switching level if the selection signal is then in a second state. The busy signal is produced whenever any of the delay module is producing a delayed clock signal, and an output signal is derived from the delayed clock signal.

9 Claims, 3 Drawing Sheets

CLOCK SIGNAL MULTIPLEX CIRCUIT

This is a continuation of application Ser. No. 07/686,679, filed Apr. 17, 1991, now abandoned.

The present invention relates to a clock signal multiplexer circuit, with the output signal from this circuit being a clock signal as identified by a selection signal.

BACKGROUND OF THE INVENTION

In electronic equipment provided with a plurality of clocks, provision is sometimes made to use some of these clocks in succession on the same component, e.g. for the purpose of reducing energy consumption or for synchronizing its operation with the operation of other components. It is therefore necessary to use a clock signal multiplexing circuit whose output signal satisfies the usual specifications for clock signals, and in particular a minimum duration for each high level and for each low level.

Multiplexers of the conventional type in which the output signal is switched from a first input signal to a second input signal as soon as the selection signal specifies a changeover cannot satisfy this condition. The switching may take place after a shorter period than that specified since the previous level change in the first input signal. It may also take place at a shorter period than that specified before a level change in the second input signal.

It is now known from the patent U.S. Pat. No. 4,899,351 and from the patent application EP 0 254 406 to provide means for ensuring that the output signal satisfies these constraints on minimum duration. However, the switchover from a first input signal to a second input signal takes place only after a relatively long delay. Further, given the way the circuits described in the above-mentioned documents are controlled, they are ill-suited to cases where the number of input signals is greater than two.

An object of the present invention is thus to provide a clock signal multiplexing circuit in which the switching time between the switching request conveyed by the selection signal and the effective switchover to the second input signal depends solely on the frequencies of the first and second input signals, and is minimal given the above duration constraints.

The invention is applicable regardless of the number of clocks; moreover, the clocks need have no a priori phase or frequency relationship with each other or with the selection signal.

SUMMARY OF THE INVENTION

The clock signal multiplexer circuit of the invention is controlled by at least one selection signal. According to the invention, an invariable switching level is constituted by one of the two levels of the clock signals, and for each clock signal the multiplexer comprises: a delay module producing a delayed clock signal taking the value of the clock signal on a first state of a selection signal and in the absence of a busy signal as soon as the switching level of said clock signal appears, and interrupting said delayed clock signal when said selection signal is in a second state and as soon as a switching level in said clock signal appears; control means producing the busy signal as soon as a delay module produces a delayed clock signal; and means for producing an output signal constituted by the delayed clock signal from the selected delay module.

In addition, in the clock signal multiplexer circuit, a selection signal is associated with each of the clock signals.

Further, in the clock signal multiplexer circuit, each delay module generates an operating signal at the same time as it produces a delayed clock signal, the control means producing the busy signal if an operating signal is present.

In a first embodiment of the clock signal multiplexer circuit, the switching level is low level, and each of the delay modules comprises a D-type bistable producing both an operating signal at the logic one state and said delayed clock signal, which delayed clock signal is the logical product of the operating signal and of the clock signal, with the synchronization input of said bistable receiving the complement of the clock signal, the data input of the bistable receiving a control signal whose level is one if the selection signal is present and if the operating signal or the complement of the busy signal are at level one.

For example, in the clock signal multiplexer circuit, the control means comprise an OR gate receiving all of the operating signals to produce the busy signal.

Advantageously, in the clock signal multiplexer circuit, each delay circuit module comprises an AND gate receiving both the selection signal and an enable signal to produce the control signal and further comprises an OR gate receiving both the operating signal and the complement of said busy signal to produce said enable signal.

In a second embodiment of the clock signal multiplexer circuit, the switching level is high level, and each of said delay modules comprises a D-type bistable simultaneously producing both the operating signal at logic level zero and the delayed clock signal, which delayed clock signal is the logic sum of the clock signal and of the operating signal, the synchronization input of the bistable receiving said clock signal, the data input of said bistable receiving a control signal whose level is one if the selection signal is zero or if the operating signal and the busy signal are at one.

For example, in the clock signal multiplexer circuit, the control means comprise a NAND gate receiving all of the operating signals to produce the busy signal.

Advantageously, in the clock signal multiplexer circuit, each delay module comprises a NAND gate receiving both the selection signal and an enable signal to produce the control signal and further comprises another NAND gate receiving both the operating signal and the busy signal to produce the enable signal.

BRIEF DESCRIPTION OF THE DRAWINGS

Embodiments of the invention are described by way of example with reference to the accompanying drawings, in which.

DETAILED DESCRIPTION

A clock signal is a periodic signal whose two states are referred to as the "working state" and as the "rest state". The rest state corresponds to the signal that should be applied to the clock input of a component in the absence of a clock signal.

The clock signal multiplexer circuit is just as applicable to the working level of these signals being the high level and the rest level being the low level as it is to the opposite convention. It is equally applicable regardless of the data medium that identifies which clock signal is to be transmitted. In the configuration used in the following description, this medium is constituted by a set of selection signals each associated with a respective one of the clock signals, it being understood that only one selection signal can be present at any one time.

Figure 1:
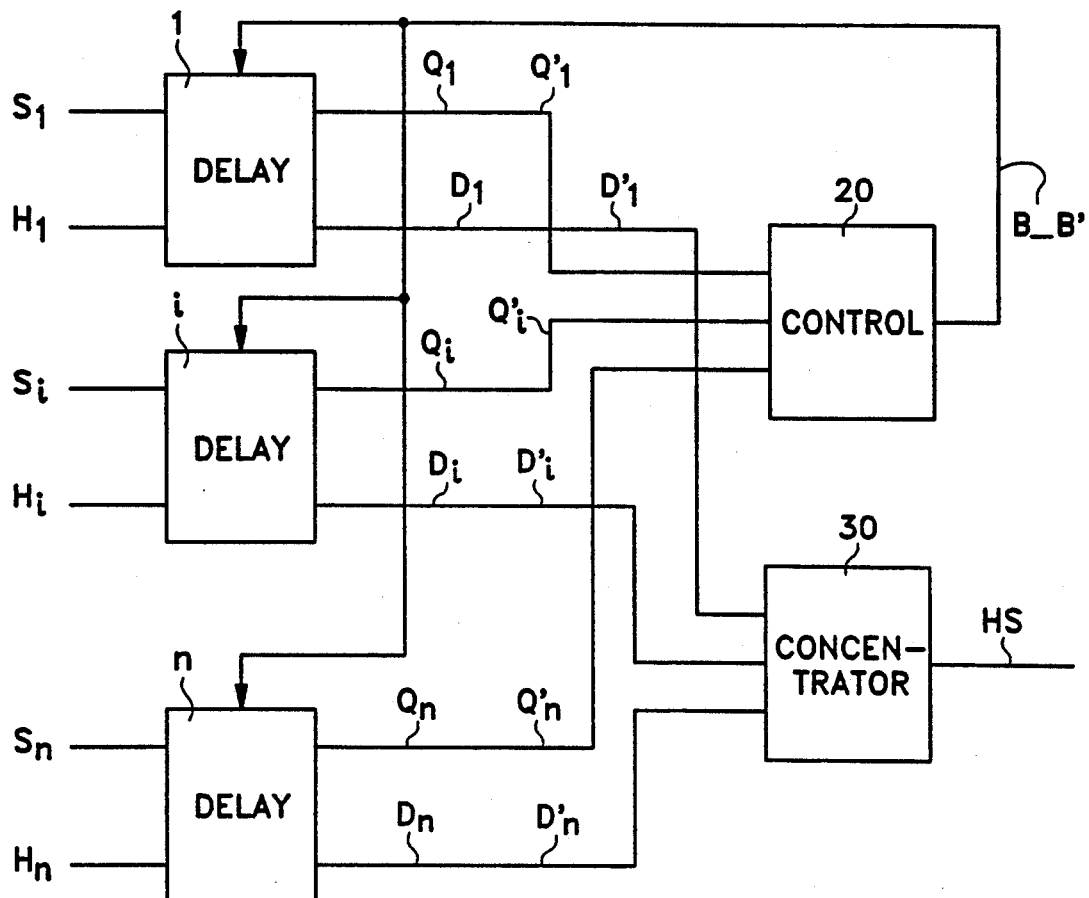
FIG. 1 is a block diagram of the clock signal multiplexer circuit of the invention.

The multiplexer circuit shown in FIG. 1 is designed to receive a number n of clock signals H1, ..., Hi, ..., Hn each associated with a respective selection signal S1, ..., Si, ..., Sn where the index i is an integer in the range 1 to n. It comprises n delay modules 1, i, n each of which receives one of the clock signals Hi and produces a delayed clock signal Di together with an operating signal Qi both of which are derived from the state of the corresponding selection signal Si and the state of a busy signal B. Only one of these modules is in operation at any given instant. The busy signal B is generated by a control module 20 when one of the operating signals Q1, ..., Qi, ..., Qn is present.

The multiplexer circuit also includes a concentrator module 30 which produces the output clock signal HS as a combination of all of the delayed clock signals D1 ..., Di, ..., Dn.

In a first embodiment which is now described, the clock signals Hi are such that the working level is high level or 1, and the rest level is low level or 0.

Figure 2:
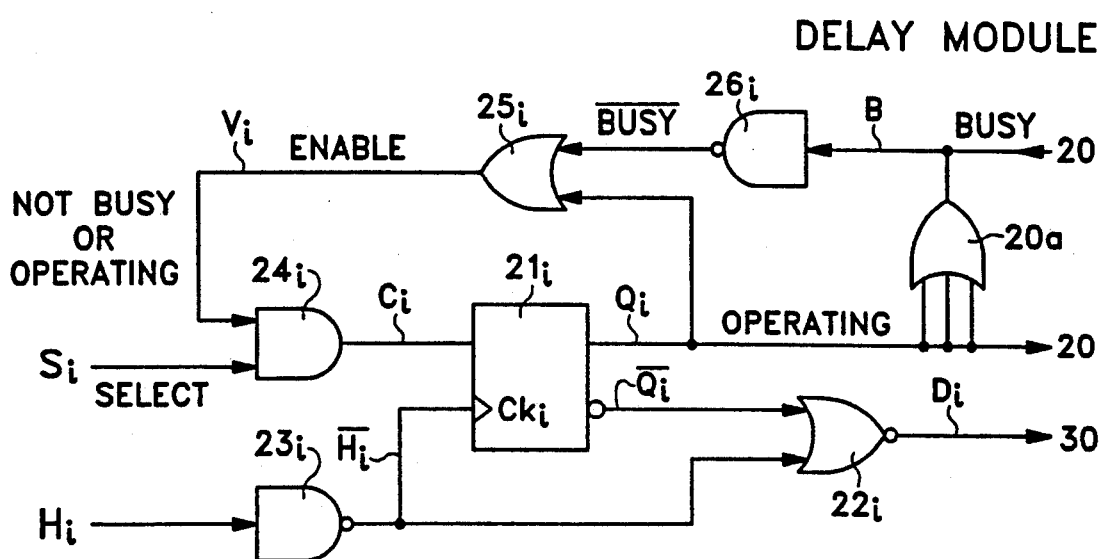
FIG. 2 is a circuit diagram of a delay module in a first embodiment of the circuit of the invention.

FIG. 2 shows delay module i which is identical to all the others. It comprises a D-type bistable 21i which produces an operating signal Qi which takes the value that was taken by the control signal Ci applied to the data input of the bistable during the preceding low level to high level transition in the signal applied to the bistable's clock input Cki. The bistable also produces a complementary operating signal $\overline{Qi}$ which is the complement of the operating signal Qi. When the operating signal Qi is present, i.e. at level 1, the delayed clock signal Di takes the value of the clock signal Hi. With reference to FIG. 2, this result is obtained by using a NOR gate 22i which receives the complemented operating signal $\overline{Qi}$ and the inverted clock signal $\overline{Hi}$ produced by an inverter 23i, thereby producing the following delayed clock signal Di:

$$Di = NOT(\overline{Qi} + \overline{Hi}) = Qi.Hi \quad (1)$$

The components are designed to ensure that the propagation time of the complemented clock signal $\overline{Hi}$ from the output of the inverter 23i to the input of NOR gate 22i is less than the time between a change in state of the complemented operating signal $\overline{Qi}$ at the same gate and the transition of the complemented clock signal $\overline{Hi}$ at the output from the inverter 23i which gave rise to this change in state. Otherwise, an undesirable switch in the delayed clock signal Di to level 1 would take place for a duration equivalent to the difference between the above-specified two propagation times. This result is obtained, for example, by placing the bistable 21i and the NOR gate 22i close together.

The control module 20 (shown symbolically in this Figure as gate 20a) produces the busy signal if only one of the operating signals is present. This may be done, for example, by means of an OR gate 20a $$B = \sum_{k=1}^{n} Qk \quad (2)$$

The control signal Ci which enables transmission of the clock signal Hi must be present, i.e. at level 1, if the selection signal is present (Si=1). In addition, the module must already be in operation (Qi=1) or the busy signal must be absent (B=0). These conditions maybe represented by the following logic equation:

$$Ci = Si.(Qi + \overline{B}) \quad (3)$$

This result is obtained by means of an AND gate 24i which produces the control signal Ci on the basis of the selection signal Si and of an enable signal Vi. The enable signal Vi comes from an OR gate 25i which receives the operating signal Qi and the busy signal $\overline{B}$ as inverted by an inverter 26i.

The concentrator module 30 which does not appear in FIG. 2 produces an output signal constituted by any one of the delayed clock signals D1, ..., Di, ..., Dn, given that two of these signals cannot be present simultaneously. It may be constituted, for example, by an OR gate:

$$HS = \sum_{k=1}^{n} Dk \quad (4)$$

The logic operators used in the various components of the multiplexer circuit are given purely by way of example. Different operators could be selected to achieve the same results as specified by the above four logic equations (1), (2), (3), (4).

The operation of the multiplexer circuit is now explained. It is assumed, initially, that none of the selection signals is present. All of the operating signals Qi are therefore at zero, thus producing an output signal HS which is likewise at zero, with the busy signal B also being at zero.

When one of the signals Si appears (Si=1), the control signal Ci of the corresponding delay module switches from zero to one. When the clock signal Hi goes from one to zero, then the complemented clock signal $\overline{Hi}$ causes the operating signal Qi to switch to one.

As a result the busy signal B switches to one and no other synchronization module can therefore be in operation.

The period during which the operating signal Qi is at level 1 is referred to as the selection period.

During this period, the delayed clock signal Di takes up the value of the clock signal Hi which is at level zero. Thus, the output signal HS which is then equal to Di remains at level zero for the same duration as does the clock signal Hi. This first switchover triggered by the appearance of a selection signal Si therefore does indeed satisfy the minimum duration condition for the low level.

Once the selection signal has switched to zero, the operating signal Qi switches to zero during the next one-to-zero transition of the clock signal Hi. It is only at this moment when the clock signal Hi and consequently the output signal HS are both at zero that the operating signal Qi and the busy signal switch to zero. Thus the initial assumption that the output signal HS is at zero when the busy signal is at zero is indeed satisfied. Since it can be assumed that the clock signal Hi satisfies the minimum duration condition both with respect to the high level and with respect to the low level, this condition is thus also satisfied by the output signal HS.

If a selection signal Sj different from the preceding selection signal Si should appear between the selection signal Si switching to zero and the busy signal B switching to zero, then the corresponding delay module j will not take it into account since the control signal Cj will remain at zero for as long as the busy signal B is at one. The control signal Cj switches to one when the output signal HS is at zero, thereby returning to the conditions investigated above. The switching time interval between a selection signal Sj switching to one and one of the delayed clock signals Dj switching to one is not less than one low level duration of the clock signal Hj, and not more than the sum of two low level durations and one high level duration of said signal and one period of the clock signal Hi, assuming that the selection signal Si switches to zero and the selection signal Sj switches to one quasi-simultaneously. The duration of this time interval is thus short and depends only on the clock signals involved in the changeover.

In a second embodiment, described below, the clock signals Hi are such that their working level is low level or zero, and their rest level is high level or one.

Figure 3:
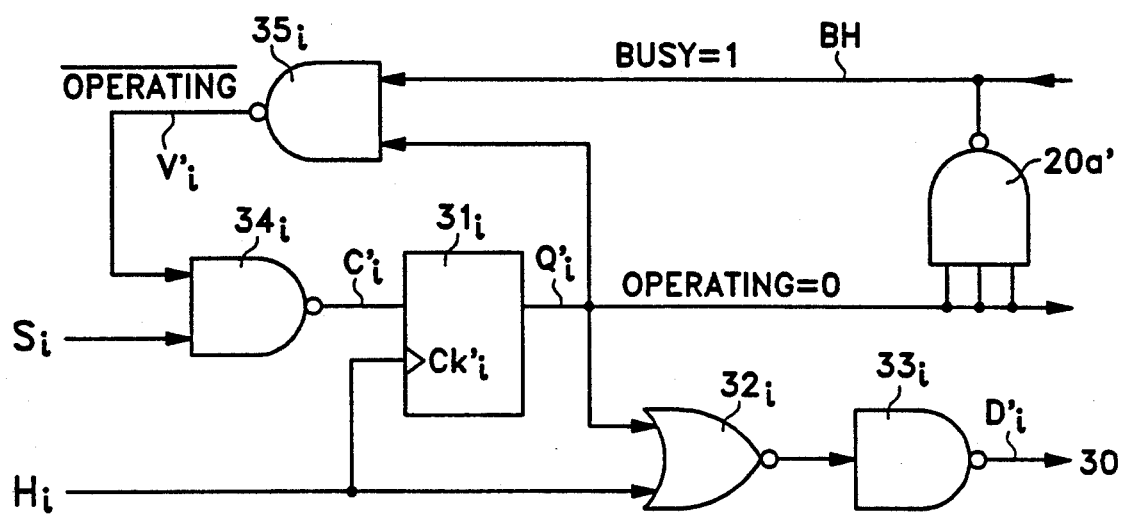
FIG. 3 is a circuit diagram of a delay module in a second embodiment of the circuit of the invention.

Delay module i shown in FIG. 3 is identical to all the others. It comprises a D-type bistable $31i$ which is identical to the above-described bistable $21i$ and which produces an operating signal Q'i which takes the value that was taken by the control signal C'i applied to the data input of the bistable during the preceding low-to-high transition in the signal applied to the clock input Ck'i of the bistable. When the operating signal Q'i is at zero, the delayed clock signal D'i takes the value of the clock signal Hi. With reference to FIG. 3, this result is obtained by using a NOR gate $32i$ which receives the operating signal Q'i and the clock signal Hi, and which is followed by an inverter $33i$ producing the delayed clock signal D'i, as follows:

$$D'i = NOT(\overline{Q'i + Hi}) = Q'i + Hi \qquad (1')$$

The remarks made in the preceding case relating to propagation time from the synchronization input Ck'i (Cki) to the inputs of NOR gate $32i$ ($22i$) apply here as well.

The control module 20 (shown symbolically in this Figure as gate $20a'$) produces the busy signal B which is at one if any one of the operating signals Q'i is at zero.

For example, it may be constituted by a NAND gate $20a'$.

$$B' = NOT\left(\prod_{k=1}^{n} Q'k\right) = \sum_{k=1}^{n} \overline{Q'k} \qquad (2')$$

The control signal C'i which enables transmission of the clock signal Hi must be at level zero if the selection signal Si is present (Si=1). In addition, either the module must already be in operation (Q'i=0) or else the busy signal must specify that none of the delay modules is in operation (B'=0).

$$\overline{C'i} = Si.(\overline{B'} + \overline{Q'i})$$

$$C'i = \overline{Si} + NOT(\overline{B'} + \overline{Q'i})$$

$$C'i = \overline{Si} + B' + Q'i \qquad (3')$$

This result is obtained by means of a NAND gate $34i$ which produces the control signal C'i from the selection signal Si and an enable signal V'i. The enable signal V'i is produced by a NAND gate $35i$ which receives the busy signal B' and the operating signal Q'i.

Figure 4:
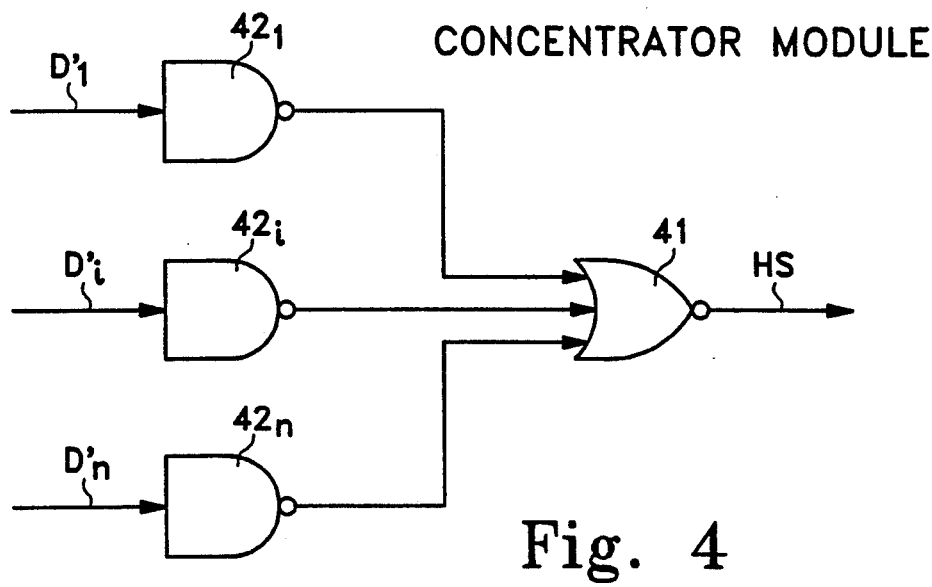
FIG. 4 is a circuit diagram of a concentrator module in the second embodiment of the circuit of the invention.

The concentrator module 30 shown in FIG. 4 produces any one of the delayed signals D'1, ..., D'i, ..., D'n as its output signal HS, with it being impossible for two of the delayed signals to be present simultaneously.

It may be constituted, for example, by a NOR gate 41 receiving each of the delayed clock signals D'1, D'i, ..., D'n via a respective inverter $42_1, \ldots, 42_i, \ldots, 42_n$.

$$HS = NOT\left(\sum_{k=1}^{n} \overline{D'i}\right) \qquad (4')$$

$$HS = \prod_{k=1}^{n} D'i$$

The logic operators used in the various components of the multiplexer circuit have been given by way of example, they are selected in this case to be of the complementing type as is generally the case in industrial applications. It may also be observed that the inverter $33_i$ of delay module i and the inverter $42_i$ of the concentrator module are disposed in series so that their effects cancel. In a practical embodiment, it is therefore advantageous to eliminate them. They were introduced into the description in order to make it easier to understand.

Different logic operators may be selected providing that they enable the results given in the above four logic equations ((1'), (2'), (3'), (4')) to be obtained.

The operation of the multiplexer circuit is now described. It is assumed, initially, that none of the selection signals is present. All of the operating signals Q'i are thus at one assuming that each synchronization input Ck'1, ..., Ck'i, ..., Ck'n has previously received a signal going from low-to-high, thereby producing an output signal HS which is likewise at one, while the busy signal B' is at zero. When one of the selection signals Si appears (Si=1), the control signal C'i switches from one to zero. When the corresponding clock signal Hi switches from zero to one, the operating signal Q'i switches from one to zero. As a result the busy signal B' switches from zero to one.

The period during which the operating signal Q'i is at level zero is referred to as the "selection period".

During this period, the delayed clock signal D'i takes the value of the clock signal Hi which is at level one. Thus, the output signal HS which is then equal to D'i remains at level one for the same duration as the signal Hi. This first switchover triggered by the appearance of a selection signal Si does thus indeed satisfy the minimum duration condition for the high level.

Once the selection signal Hi has switched to zero, the operating signal Q'i switches to one on the next zeroto-one transition in the clock signal Hi. It is only at this moment when the clock signal Hi and consequently the output signal HS are both at one that the operating signal Q'i switches to one and the busy signal switches to zero. Thus, the initial assumption that the output signal HS is at one when the busy signal is at zero is indeed confirmed. Since it can be assumed that the clock signal Hi satisfies the minimum duration condition both with respect to the high level and with respect to the low level, this condition is therefore also satisfied by the output signal HS.

If a selection signal Sj different from the preceding selection signal Hi appears between the selection signal Hi switching to zero and the busy signal B' switching to zero, then it is not taken into account by the corresponding delay module j since the control signal C'j will remain at one for as long as the busy signal remains at one. The control signal C'j switches to zero when the output signal HS is at one, thereby returning to the preceding conditions. The time interval between the selection signal Sj switching to one and the delayed clock signal D'j switching to zero is not less than one high level duration of the clock signal Hj and not more than the sum of two high level durations, and one low level duration of said signal plus one period of the clock signal Hi, assuming that the selection signal Si switches to zero substantially simultaneously with the selection signal Sj switching to one. The duration of this time interval is therefore short and depends only on the clock signals involved in the changeover.

Figure 5:
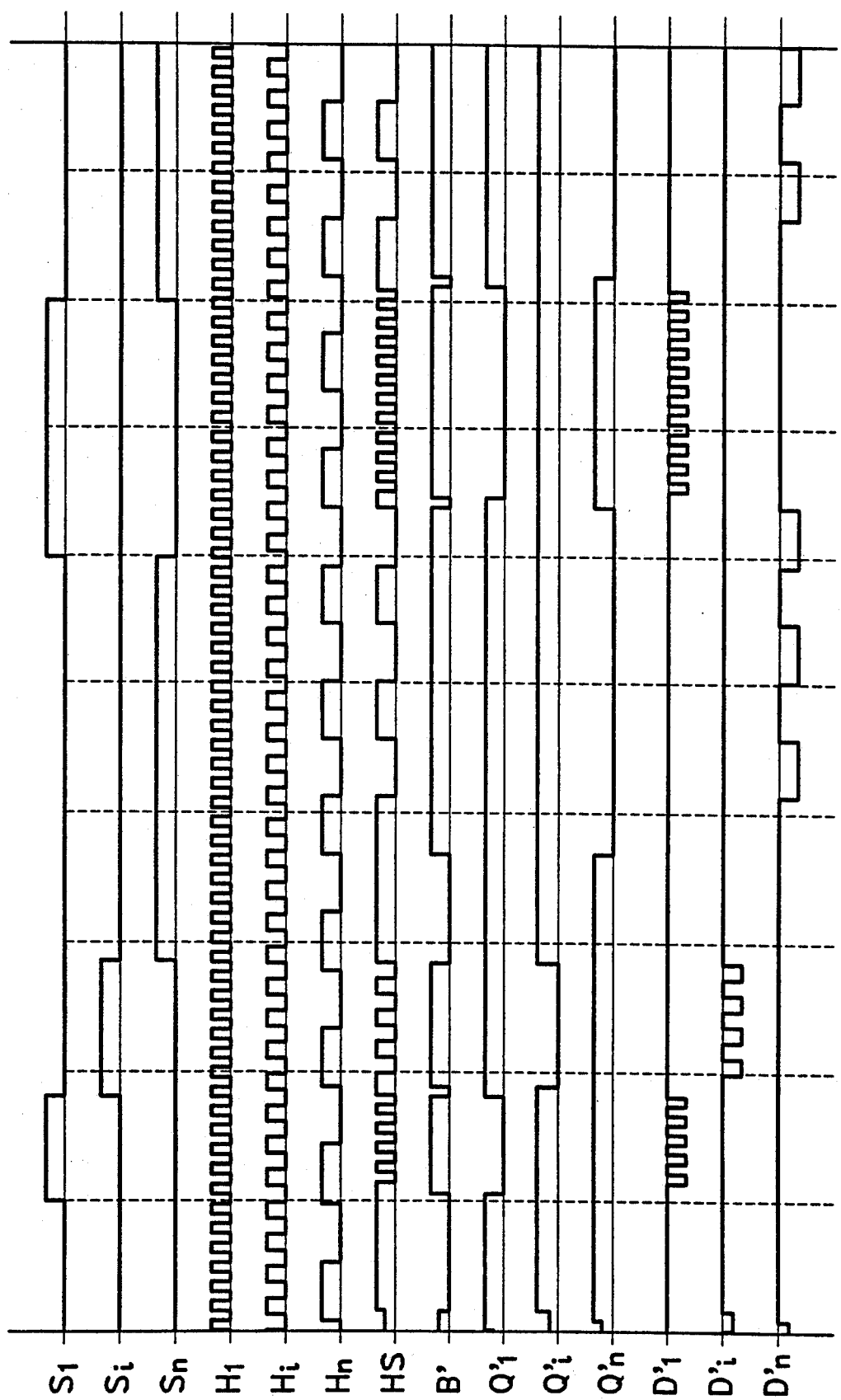
FIG. 5 is a timing diagram for describing the operation of a multiplexer circuit of the invention for multiplexing three clock signals.

FIG. 5 is a timing diagram showing the operation of the multiplexer circuit when there are three clock signals H1, Hi, Hn.

The invention thus makes it possible to provide a clock signal multiplexer circuit which satisfies minimum duration constraints both on high level and on low level regardless of whether the rest level is low level or high level.

In the two above embodiments, the multiplexer circuit selects a clock signal at the moment the clock signal takes up a rest level and likewise it ceases to transmit a clock signal when a rest level in that signal appears. The rest level can therefore also be called a switching level.

Without going beyond the scope of the invention, providing that the output signal is maintained at the working level so long as no clock signal is being transmitted, the multiplexer circuit could similarly select a clock signal at the moment a working level appears therein and could cease transmitting it likewise at the moment a working level appears therein. It is thus equally possible for the switching level to be the working level.

I claim:

1. A multiplexer circuit for multiplexing at least two input clock signals, each of the clock signals being a periodic signal assuming either of two states corresponding to a predetermined rest level and a predetermined switching level, wherein the multiplexer circuit comprises:

for each of the at least two input clock signals, a respective delay module responsive to a respective said input clock signal, a selection signal, and a common busy signal, for simultaneously producing a respective operating signal and a respective delayed clock signal taking the value of the respective input clock signal, in response to one state of the selection signal and in the absence of the common busy signal at the moment the switching level of the respective input clock signal appears, and for interrupting the respective operating signal and the respective delayed clock signal in response to another state of the selection signal at the moment the predetermined switching level of the respective input clock signal appears;

control means responsive to all said respective operating signals for producing said common busy signal; and output means responsive to all said respective delayed clock signals for producing a common output signal.

2. A multiplexer circuit according to claim 1, wherein a different said selection signal is associated with each of said input clock signals.

3. A multiplexer circuit according to claim 1, comprising at least three of said delay modules, one for each of at least three respective input clock signals.

4. A multiplexer circuit for multiplexing at least two input clock signals, each of the clock signals being a periodic signal assuming either of two states corresponding respectively to a logic one level and a logic zero level, the logic zero level establishing a predetermined switching level, the multiplexer circuit comprising:

for each of the input clock signals, a respective delay module, each said delay module being responsive to a respective said input clock signal, a respective selection signal, and a common busy signal, each said respective delay module including a D-type bistable having a synchronization input, a data input, and a data output, for outputting a logic one level operating signal at the data output if a logic one level control signal is present at the data input when a synchronization signal at the synchronization input changes state from logic zero level to logic one level, and for producing a logic zero level operating signal at the data output if a logic one level control signal is not present at the data input when the synchronization signal at the synchronization input changes state from logic zero level to logic one level, means for applying the complement of said input clock signal to said synchronization input, means for causing said control signal at the data input of the D-type bistable to assume a logic one level if the only if said respective selection signal is at logic one level and either said operating signal at the output of the D-type bistable is at logic one level or said common busy signal is at logic zero level, and means for producing a delayed clock signal equal to a logical product of said operating signal at the output of the D-type bistable and of said respective input clock signal;

control means responsive to all said respective operating signals for producing said common busy signal at a logic one level when at least one of said respective operating signals is at logic one level; and concentrator means responsive to all said respective delayed clock signals for producing a common output signal.

5. A multiplexer circuit according to claim 4, wherein said control means comprises an OR gate receiving all of said respective operating signals to produce said common busy signal.

6. A multiplexer circuit according to claim 4, wherein each said delay module comprises an AND gate receiving both said respective selection signal and a respective enable signal to produce said respective control signal, and further comprises an OR gate receiving both said respective operating signal and the complement of said common busy signal to produce said respective enable signal.

7. A multiplexer circuit for multiplexing at least two input clock signals, each of the clock signals being a periodic signal assuming either of two states corresponding respectively to a logic one level and a logic zero level, the logic one level establishing a predetermined switching level, the multiplexer circuit comprising:

for each of the input clock signals, a respective delay module, each said delay module being responsive to a respective said input clock signal, a respective selection signal, and a common busy signal, each said respective delay module including a D-type bistable having a synchronization input, a data input, and a data output, for outputting a logic zero level operating signal at the data output if a logic zero level control signal is present at the data input when a synchronization signal at the synchronization input changes state from logic zero level to logic one level, and for producing a logic one level operating signal at the data output if a logic zero level control signal is not present at the data input when the synchronization signal at the synchronization input changes state from logic zero level to logic one level, means for applying said input clock signal to said synchronization input, means for causing said control signal at the data input of the D-type bistable to assume a logic zero level if and only if said respective selection signal is at logic one level and either said operating signal at the output of the D-type bistable is at logic zero level or said common busy signal is at logic zero level, and means for producing a delayed clock signal equal to a logical sum of said operating signal at the output of the D-type bistable and of said respective input clock signal;

control means responsive to all said respective operating signals for producing said common busy signal at a logic one level when at least one of said respective operating signals is at logic zero level; and concentrator means responsive to all said respective delayed clock signals for producing a common output signal.

8. A multiplexer circuit according to claim 7, wherein said control means comprise a NAND gate receiving all of said respective operating signals to produce said common busy signal.

9. A multiplexer circuit according to claim 7, wherein each said delay module comprises a NAND gate receiving both said respective selection signal and a respective enable signal to produce said respective control signal and further comprises another NAND gate receiving both said respective operating signal and said common busy signal to produce said enable signal.

* * * * *